United States Patent
Neal

[15] 3,648,031
[45] Mar. 7, 1972

[54] CONTROL SYSTEM FILTERING TECHNIQUE
[72] Inventor: Gordon L. Neal, Cedar Rapids, Iowa
[73] Assignee: Collins Radio Company, Cedar Rapids, Iowa
[22] Filed: Oct. 30, 1970
[21] Appl. No.: 85,591

[52] U.S. Cl. ........................................ 235/150.1, 318/616
[51] Int. Cl. ................................................. G05b 6/02
[58] Field of Search ............... 235/150.1, 150.2, 150.25; 318/580, 615, 616, 620, 629

[56] References Cited
UNITED STATES PATENTS 3,296,422  1/1967  Rusler, Jr. ........................ 235/150.25
3,446,946  5/1969  Andeen ............................. 235/150.1

Primary Examiner—Eugene G. Botz
Attorney—Richard W. Anderson and Robert J. Crawford

[57] ABSTRACT

A control system filtering technique permits heavy noise filtering of a position input signal without introduction of system instabilities. A rate of change of the filtered position signal is derived and utilized in a feedback loop to complement the signal from which the rate signal was derived, permitting heavy position signal filtering without position loop phase lag and thus effectively separating the problem of generating a tight control from the sensor noise problem.

4 Claims, 5 Drawing Figures

INVENTOR
GORDON L. NEAL

BY  *R. W. Anderson*

AGENT

INVENTOR
GORDON L. NEAL

BY R. W. Anderson
AGENT 3,648,031

CONTROL SYSTEM FILTERING TECHNIQUE

This invention relates generally to filtering techniques and more particularly to filtering techniques as applied to control systems by means of which noise perturbations on a control signal may be heavily filtered without jeopardizing system stability.

It is often desired to develop control systems for vehicles or other mechanisms in which the goal is control of position relative to a reference. Typically such a controller might consist of a summation of position, rate, and acceleration errors with appropriate command limits.

The problem often occurring in such control systems is that the position and rate sensors employed therewith are badly distorted with noise. In an automatic pilot control system for an aircraft, for example, barometric altitudes, and altitude rate, and radio beam noise are typically excessive. In the case of an aircraft beam position follower, the beam sensor process per se contains random and deterministic errors that make it very difficult to tighten the loop sufficiently to obtain good control characteristics without causing excess actuator activity. Beam rate is even noisier, and as a result much of flight control work is involved with attempts to complement the rate signal by deriving rates from beam error and aircraft acceleration.

Even the most sophisticated of known complementation systems, however, still suffer from excess transmission of radio deviation noise to the control surface through the position and rate paths. One might alleviate the noise problem by applying a quadratic filter to beam noise, for example; but as the filter time constant is increased, the added phase shift results in system instability, and thus limits possible filtering to small time constants. Thus, control system designs employing displacement, rate, and acceleration input parameters are generally designed for the best trade-off between system stability and noise filtering for a particular application.

Accordingly, an object of the present invention is the provision of a complementation system which allows position information to be heavily filtered while not adversely affecting system stability.

The present invention is featured in the employment of accelerometer complementation of filtered position information to inertially augment or reconstruct the high-frequency filtered position information while rejecting noise.

A further feature of the present invention is the employment of a complementation scheme in a position control system employing a feedback technique by means of which the estimated rate is utilized to provide a better estimate of position and additionally to update the estimated rate. The approach might generally be defined as using derived rate in a feedback loop in a control system to complement the signal from which the rate was derived, with the benefit that, within the constraints of circuit building capability, heavy filtering without position loop phase lag is possible, thus effectively separating the problem of generating a "tight" control from the sensor noise problem.

These and other features and objects of the present invention will become apparent upon reading the following description in conjunction with the accompanying drawings in which.

Figure 1:
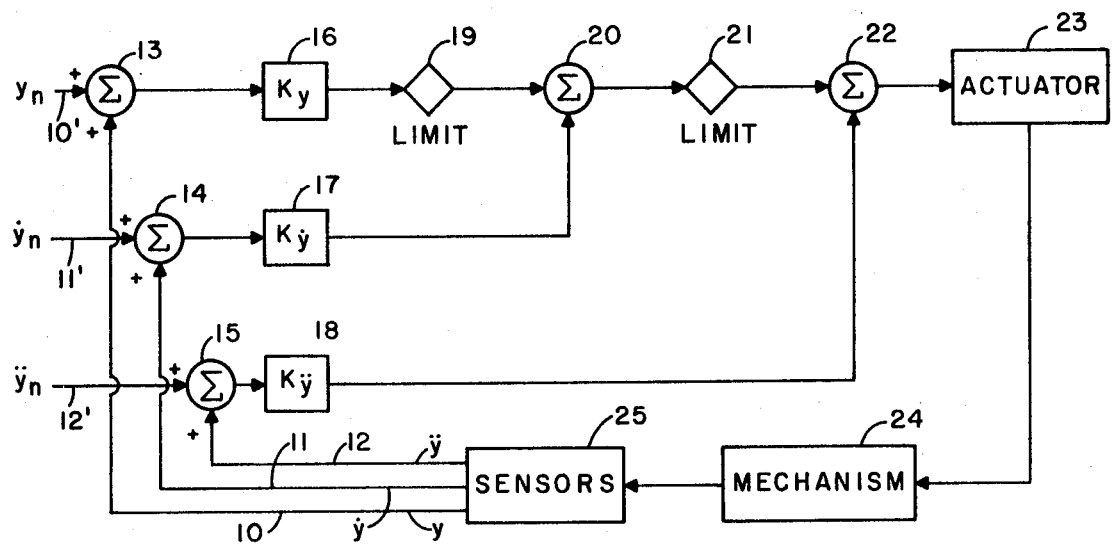
FIG. 1 is a functional diagram of a typical position control system employing position rate and acceleration input sensors.

FIG. 1 functionally depicts a typical system for the control of position relative to a reference. Such a system typically may consist of a summation of position, rate, and acceleration errors with appropriate command limits. Position, rate, and acceleration signals 10, 11, and 12 are supplied from the sensor block 25. FIG. 1 is drawn to emphasize that each of the sensor inputs is comprised of the actual signal plus undesirable noise which is present thereon. As such, FIG. 1 depicts a summation of each of the position, rate, and acceleration signals with their associated sensor noise components 10', 11', and 12'. The outputs from summing devices 13, 14, and 15 are applied as inputs to the system.

Each of the position, rate, and acceleration inputs plus its associated noise is depicted as being applied through particular system gain functions 16, 17, and 18 for typical summations and with limiting functions as represented by summing devices 20 and 22 and limiting devices 19 and 21. The output from summing device 22 is applied to an actuator 23 which controls a mechanism 24 which in turn influences the sensors 25.

As above discussed, problems are encountered in position control systems when inherently noisy input position and rate signals are to be effectively filtered. A trade-off is usually necessary between the elimination of such noise and the introduction of system instabilities which result from heavy noise filtering. The technique of the present invention, by means of which heavy filtering of such noisy input signals is permitted without affecting the system stability, might best be described through specific examples.

Consider, for example, a beam coupling computer for the purpose of tracking a localizer navigation beam. Numerous schemes for concocting rate by complementation schemes have been employed. Heading damping has been employed for this purpose with the adverse result that cross wind results in beam error. High-passed heading techniques have been employed with the adverse effect of wind shear standoffs and poor damping. The radio beam signal has been differentiated to obtain rate, the result being an extremely noisy rate signal. Complementary filter techniques have been employed but here again wind shear standoffs have been encountered and the resulting signal has been noisy and slow.

A current scheme that has gathered general acceptance is the employment of a lagged roll system. This approach, however, may still suffer from excess transmission of radio deviation noise to the control surface through the position and rate paths. To apply heavy filtering to beam noise results in increased phase shift and system instability. In such systems, filter time constants might be increased by complementary filtering techniques whereby acceleration and rate are used to complement position, thus removing the filter phase lag. Rate signals for this task, however, are typically not available, and it is to this particular problem that the present invention is uniquely directed.

Figure 2:
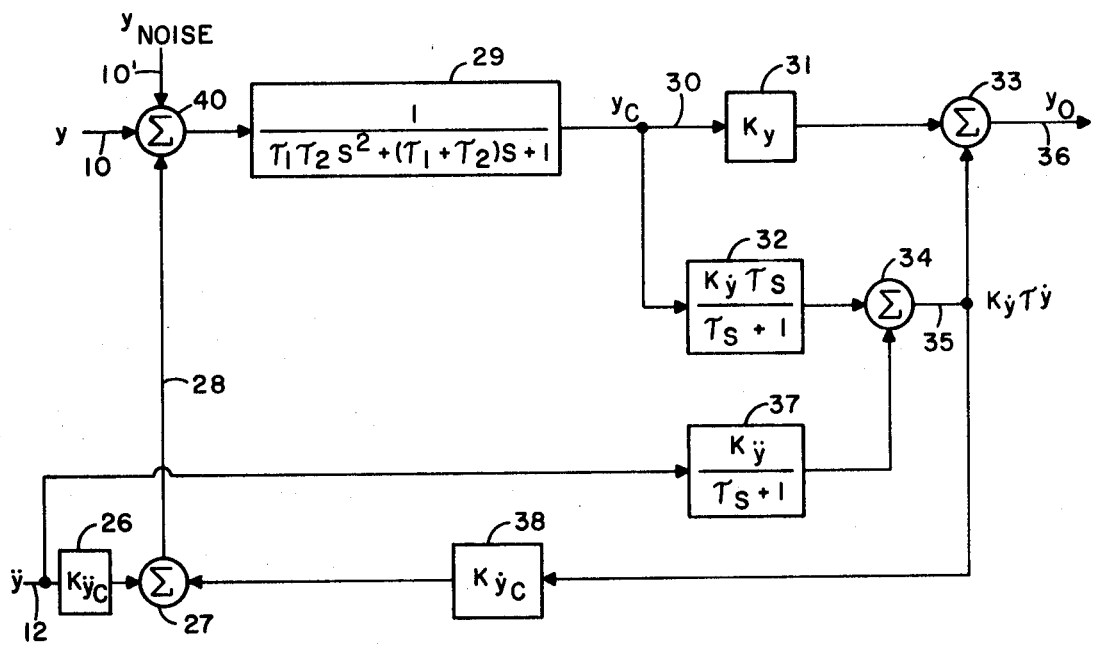
FIG. 2 is a functional diagram of a system of rate complementation in accordance with the present invention.

An embodiment of a complementation scheme in accordance with the present invention is shown functionally in FIG. 2. The system filters the position input signal to remove the high noise frequency noise perturbations, derives a rate signal from the filtered position signal, and utilizes the derived rate signal in a feedback loop to complement the position input signal from which the rate signal was in fact derived. The derived rate signal (which has also been filtered) is in turn added to the filtered position signal to provide an output position and rate signal from which noise has been heavily filtered and which exhibits minimal phase lag with respect to the noisy input signal.

With reference to FIG. 2 the position input signal $y$ is illustrated as being applied on line 10 as the first input to an adder 40. The noise perturbations present on the position signal $y$ are depicted as a second input 10' to adder 40, it being realized that in an actual embodiment $y$ and $y_{noise}$ would compositely represent a noisy input to adder 40. A feedback signal 28 is applied as a further input to adder 40. The functions of the blocks in FIG. 2 are depicted in Laplacian form to represent the transfer function. The output from adder 40 is applied to a second-order low-pass filter 29 to develop an output signal 30 depicted as $y_c$. $Y_c$ is a complemented position signal, that is, a position signal from which noise has been filtered. The filtered position signal $y_c$ is applied through a gain function 31 as a first input to adder 33. The filtered position signal is additionally applied to a high-pass filter 32 as a first input to adder 34. An acceleration input signal $\ddot{y}$ on line 12 is passed through a low-pass filter 37 and summed with the output from high-pass filter 32 in adder 34. The output 35 from adder 34, in accordance with the present invention, is a complemented rate signal which is applied as a second input to the output adder 33 from which the noisefree position and rate output signal is taken, and, through a feedback loop back through a gain function 38 for summation in adder 27 with the acceleration signal 12 as applied through a gain function 26. The output 28 from adder 27 is applied as a feedback signal to the input adder 40 to complement the input position signal in a manner such that the ensuing phase lag in low-pass filter 29 is removed.

For purposes of explaining the operation of the system of FIG. 2 let it first be assumed that $y_c$, the output from low-pass filter 29, is an accurately complemented position information signal, that is, $y=y_c$. With this assumption the complemented rate signal on line 35 may be shown to be rate of change of position $\dot{y}$ with a gain of $K_{ij}\tau$ by consideration of the following Laplacian relationships.

$$L[K_{ij}\tau\dot{y}] = \frac{K_{ij}\tau sy}{\tau s+1} + \frac{K_{ij}s^2 y}{\tau s+1}$$

$$= \frac{(K_{ij}\tau + K_{ij}s)sy}{\tau s+1}$$

$$= \frac{K_{ij}\tau sy\left(1+\dfrac{K_{ij}s}{K_{ij}\tau}\right)}{1+\tau s}$$

Setting $K_{ij}/K_{ij}\tau=\tau$, and performing an inverse Laplace operation gives:

$$K_{ij}\tau\dot{y} = K_{ij}\tau\dot{y}$$

Therefore, given the assumption that $y_c=y$, the output from the rate deriver is, in fact, $\dot{y}$ with a gain $K_{ij}\tau$. Further, $y_c$ may be expressed as:

$$y_c = \frac{K_{\ddot{y}_c}s^2 y + K_{\ddot{y}_c}K_{ij}\tau sy + y}{\tau_1\tau_2 s^2 + (\tau_1+\tau_2)s+1},$$

or $$y_c = \frac{(K_{\ddot{y}_c}s^2 + K_{\ddot{y}_c}K_{ij}\tau s+1)y}{\tau_1\tau_2 s^2 + (\tau_1+\tau_2)s+1}.$$

If $K_{\ddot{y}_c}=\tau_1\tau_2$ and $K_{\ddot{y}_c}K_{ij}\tau=(\tau_1+\tau_2)$:

$$y_c=y,$$

which was the initial assumption.

Figure 3:
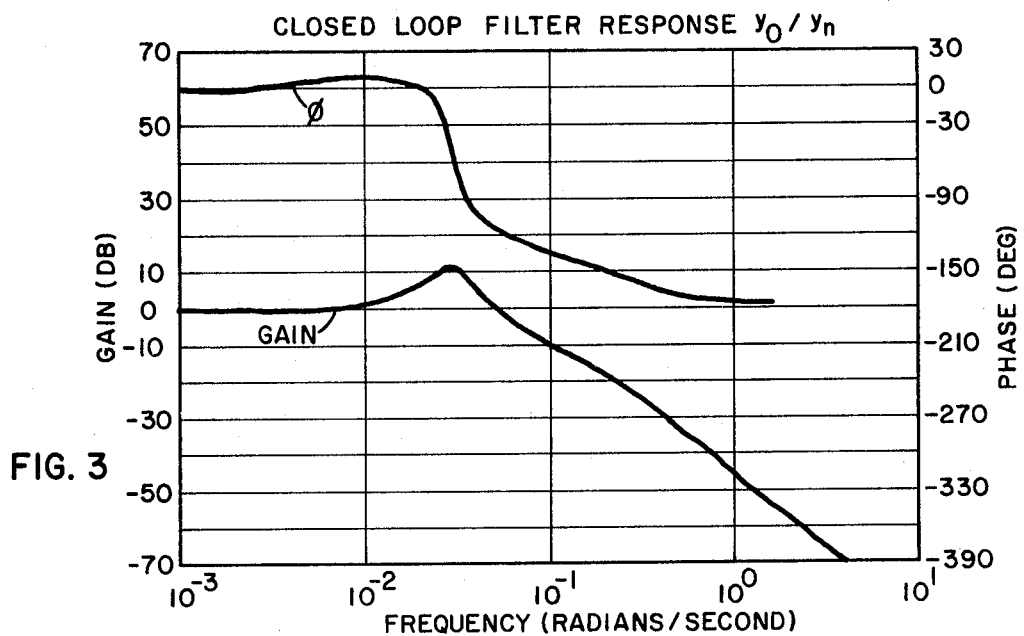
FIG. 3 illustrates the Bode frequency transfer response of the filtered output position signal of the present invention from position signal noise.
Figure 4:
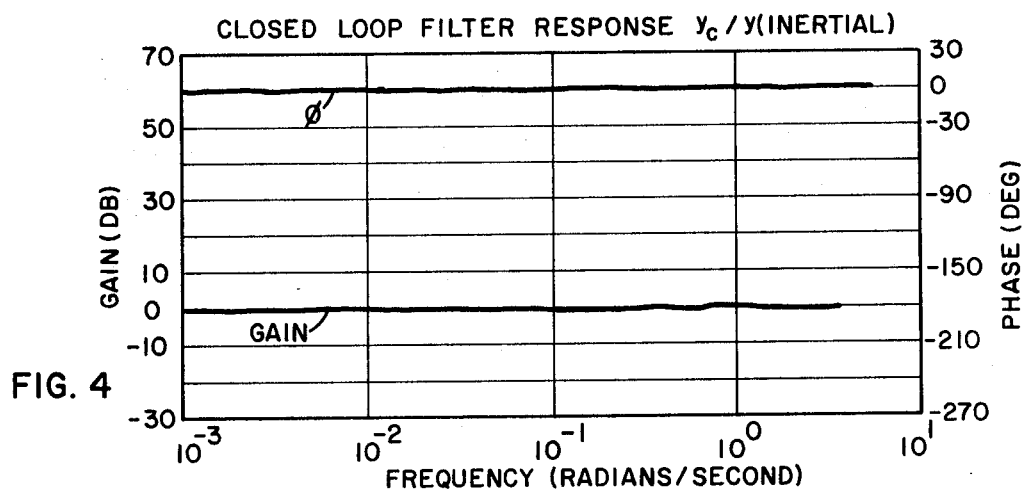
FIG. 4 illustrates the Bode frequency transfer response of the filtered complemented position signal of the present invention to inertial position.

FIG. 3 shows the Bode frequency transfer closed loop response of $y_0$ from radio noise $y_n$ and FIG. 4 shows the Bode frequency transfer closed loop response of $y_c$ to $y$ inertial ($y$ inertial being the position signal devoid of noise).

The obviously desirable filter quality depicted in FIG. 3 and the perfect transmission with no phase lag of $y$ (inertial) is the desired result.

The present invention thus permits filtering of extraneous high-frequency radio noise in a manner such that no position loop lag is introduced, thus making possible any degree of filtering desired within the constraints of practical circuitry designs. The upper limit to the filter time constant is imposed by the accelerometer null error. The null error could be removed by the use of a long time constant high-pass filter, and circuit anomalies would limit the possible time constant allowable.

The technique defined herein is not restricted to the particular rate complementation scheme illustrated in FIG. 2. It could be used with any rate deriving technique with varying degrees of success. FIG. 2 illustrates a preferred embodiment utilizing a second order low pass filtering of the position input signal.

Figure 5:
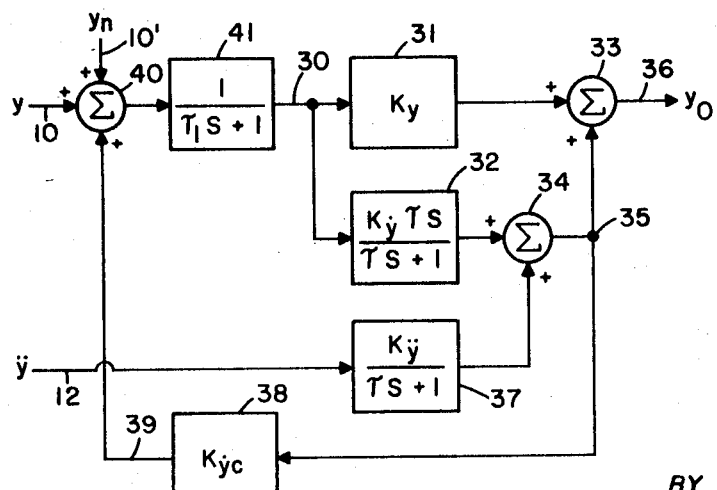
FIG. 5 is a functional diagram of a further embodiment of the present invention wherein the noisy position signal is filtered by a first order filter.

The technique of the present invention can also be extended to first order filters as illustrated by the embodiment depicted in FIG. 5. Reference to FIG. 5 employs a first order low-pass filter 41. Position signal from input mixer 40 is supplied through filter 41 on line 30 through gain function 31 to output adder 33 and additionally through a high-pass filter 32 as a first input to adder 34. The second input to adder 34 is again acceleration from line 12, as applied through a low-pass filter 37. Again the derived rate signal on line 35 is a complemented rate signal derived from acceleration and position input parameters and defined as $\dot{y}$ with a gain of $K_{ij}\tau$. The derived rate of change of position signal from line 35 is applied back through gain function 38 directly as the complementing input to the input adder 40. As distinguished from the embodiment of FIG. 2, which employed a second-order low-pass position input filter 29, the embodiment of FIG. 5, in employing a first-order low-pass filter 41, does not require an acceleration complementation term.

It is further to be noted that higher order position filters could be dealt with in kind but are generally not needed in the type of exampled embodiment.

The present invention is thus seen to provide a filter technique permitting heavy filtering of noisy position signal in a control system without the introduction of loop lag which lends to system stability. In the exampled embodiment, wherein the position signal is considered to be radio beam deviation in an aircraft control system, the technique of the present invention serves to eliminate the nemesis of this type of control activity. The novel aspects of the technique reside in the use of the rate (derived) in the feedback loop to complement the signal from which the rate was derived. The benefit derived is that, within the constraints of circuit building capability, filtering without position phase loop lag is possible and this effectively separates the problem of generating a "tight" control from the sensor noise problem.

Although this invention has been described with respect to particular embodiments thereof, it is not to be so limited as changes may be made therein which fall within the scope of the invention as defined in the appended claims.

I claim:

1. In a control system wherein a position input signal is heavily filtered to remove high frequency noise perturbations thereon, means for deriving a rate signal from said filtered position signal, means for applying said derived rate of change of position signal in a feedback loop to complement the position input signal from which said rate signal was derived, and means for adding said derived rate of change of position signal to said filtered position signal to provide a position and rate output signal the phase lag of which with respect to said input position signal is minimized.

2. In a control system, means for deriving from a noisy position input signal an output position and rate signal from which noise is heavily filtered without introducing position-loop phase lag, comprising means for low-pass filtering said position input signal, means for deriving a rate of change of position signal from at least said low pass filtered position input signal, means summing said derived rate of change of position signal with said low pass filtered position signal to provide said output position and rate signal, and means for summing said derived rate of change of position signal with said position input signal as applied to said low-pass filtering means.

3. Signal derivation means as defined in claim 2 wherein said means for deriving a rate of change of position signal comprises a signal proportional to inertial acceleration, means for low pass filtering said acceleration signal, means for high pass filtering said low-pass filtered position input signal, summing means receiving said low pass filtered acceleration signal and the output of said high-pass filtering means, the output of said summing means comprising said derived rate of change of position signal.

4. Signal derivation means as defined in claim 3 wherein said position low pass filtering means comprises a second order filter and further comprising means for summing said inertial acceleration signal and said derived rate of change of position feedback signal with said input position signal for application to said low-pass filtering means.

* * * * *